United States Patent [19]

Ohasi et al.

[11] Patent Number: 5,053,181
[45] Date of Patent: Oct. 1, 1991

[54] MOLDED RESIN ARTICLE AND A METHOD FOR THE MANUFACTURE THEREOF

[75] Inventors: Yutaka Ōhashi; Kenichi Ōno; Toshihiko Goto, all of Himeji, Japan

[73] Assignee: Mitsubishi Denki Kabushiki Kaisha, Japan

[21] Appl. No.: 423,724

[22] Filed: Oct. 20, 1989

Related U.S. Application Data

[60] Continuation of Ser. No. 247,337, Sep. 21, 1988, abandoned, which is a division of Ser. No. 63,322, Jun. 18, 1987, abandoned.

[51] Int. Cl.$^5$ ............................................... B29C 45/33
[52] U.S. Cl. ................................ 264/296; 264/328.7; 425/555; 425/577
[58] Field of Search ...................... 264/294, 296, 328.7, 264/328.8, 328.11, 328.16; 425/552, 555, 577

[56] References Cited

U.S. PATENT DOCUMENTS

| | | | |
|---|---|---|---|
| 2,781,547 | 2/1957 | Moxness | 425/555 |
| 4,184,835 | 1/1980 | Talbot | 425/577 |
| 4,339,408 | 7/1982 | Jenkins | 425/555 |
| 4,540,534 | 9/1985 | Grendol | 425/555 |
| 4,562,317 | 12/1985 | Gerber et al. | |
| 4,659,533 | 4/1987 | Abramson, Jr. | 264/570 |
| 4,735,563 | 4/1988 | Tanaka et al. | 425/116 |

FOREIGN PATENT DOCUMENTS

| | | |
|---|---|---|
| 55-97941 | 4/1980 | Japan . |
| 58-53424 | 3/1983 | Japan . |
| 59-22294 | 7/1984 | Japan . |

Primary Examiner—Jill L. Heitbrink
Attorney, Agent, or Firm—Leydig, Voit & Mayer

[57] ABSTRACT

A manufacturing method for a molded resin article includes an injection step of injecting a resin molding material into a mold, a compression step of compressing a prescribed portion of the resin molding material, a cooling step of solidifying the resin molding material by cooling while maintaining pressure on the prescribed portion, and a removal step of removing the resulting molded resin article from the mold. The compression prevents the formation of voids in the compressed portion and increases the dielectric strength thereof. In a preferred embodiment, the molded article is a distributor rotor for an internal combustion engine.

1 Claim, 2 Drawing Sheets

MOLDED RESIN ARTICLE AND A METHOD FOR THE MANUFACTURE THEREOF

This application is a continuation of application Ser. No. 07/247,337 filed Sept. 21, 1988, now abandoned, which is a divisional application of Ser. No. 063,322 filed on June 18, 1987, now abandoned

BACKGROUND OF THE INVENTION

This invention relates to a molded resin article and a method for the manufacture thereof. More particularly but not exclusively, it relates to a molded resin distributor rotor for an ignition distributor of an internal combustion engine and to a method of manufacturing the distributor rotor.

The distributor rotor of an ignition distributor for an internal combustion engine is generally formed by the injection molding of a thermoplastic resin. Due to air which is entrained with the resin during injection or due to sink marks which form during the cooling of the resin, voids inevitably form in the thick portions of the distributor rotor, such as in the central portion of the rotor which fits over the spark advance sleeve of the distributor. A distributor rotor is required to have excellent dielectric strength, and therefore these voids are highly undesirable, since they decrease the dielectric strength of the rotor. Furthermore, gas discharges may occur within the voids, which over a period of time may chemically and mechanically degrade the resin to the point of breakdown. In the worst case, a ground short can occur through the distributor rotor, adequate electrical energy for ignition can not be obtained, and the ignition is poor.

Various methods have been proposed for minimizing the number of such voids in a molded distributor rotor. For example, Japanese Utility Model Laid-Open No. 59-22294 (1984) discloses a method of molding a distributor rotor by injection molding in which the mold gate opens onto the outer periphery of the rotor along the balance portion thereof. Although that method disperses the voids within the rotor and reduces the diameters thereof, it can not completely prevent the formation of voids at the central portion of the rotor where the greatest dielectric strength is required, and therefore it is not completely satisfactory.

SUMMARY OF THE INVENTION

It is accordingly an object of the present invention to provide a molded resin article formed by injection molding which is free of voids in the portion thereof requiring the greatest dielectric strength.

It is another object of the present invention to provide an injection molding method for the manufacture of such a molded resin article.

The present inventors found that if a portion of a molded resin article is kept under pressure during the cooling stage of molding, the formation of voids in the compressed portion can be completely prevented and a molded article having excellent dielectric strength in the compressed portion can be obtained. A molding method in accordance with the present invention therefore comprises an injection step in which a resin molding material is injected into a mold cavity so as to fill the mold cavity, a compression step in which a prescribed portion of the resin molding material within the mold cavity is compressed, a cooling step in which the resin molding material is solidified by cooling while the compressive force on the prescribed portion is maintained, and a removal step in which the resulting molded resin article is removed from the mold after cooling. The compression step is carried out at a time at least after the injection step but before the completion of the cooling step.

A molded resin article in accordance with the present invention is one which is manufactured by the above-described injection step, compression step, cooling step, and removal step.

In a preferred embodiment, the injection molding is performed using a mold having a plunger slidably disposed in one of the mold halves of the mold. During the injection step, the plunger is retracted from the mold cavity, and the resin molding material is injected so as to fill the space between the plunger and the mold cavity. In the compression step, the plunger is forcefully driven towards the mold cavity, and the resin molding material in the space beneath the plunger is pushed into the mold cavity and compressed. A force is maintained on the plunger during the cooling step so as to keep the portion of the molded article beneath the plunger in compression.

In a preferred embodiment, the molded resin article is a distributor rotor of an ignition distributor for an internal combustion engine, and the portion of the molded article which is compressed during molding is the center of the rotor.

BRIEF DESCRIPTION OF THE DRAWINGS

In the drawings, the same reference numerals indicate the same or corresponding parts.

DESCRIPTION OF THE PREFERRED EMBODIMENTS

Figure 1:
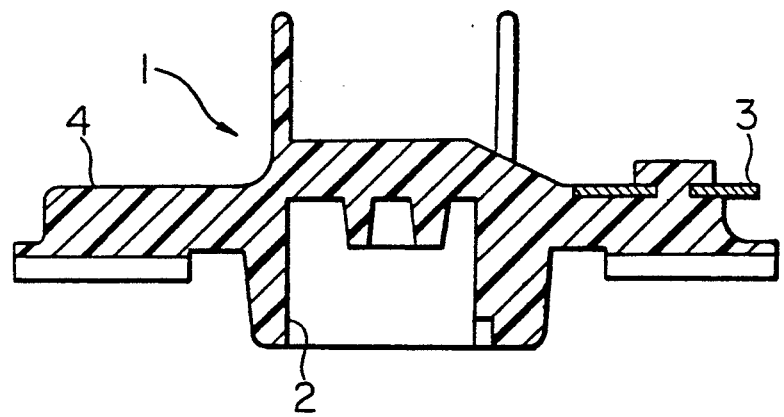
FIG. 1 is a vertical cross-sectional view of a completed distributor rotor in accordance with the present invention.

Hereinbelow, the manufacturing method in accordance with the present invention and a molded resin article manufactured by this method will be described while referring to the accompanying drawings. FIG. 1 illustrates an embodiment of a molded resin article in accordance with the present invention in the form of a distributor rotor 1. The shape of this distributor rotor 1 is identical to that of a conventional distributor rotor. The body thereof is made of a conventional thermoplastic resin and has a cylindrical cavity 2 formed in the center thereof which fits tightly over the spark advance sleeve of an ignition distributor. An electrically-conducting rotor segment 3 is embedded in one side of the body of the rotor 1, and the other side of the body serves as a balance 4 for balancing the rotor 1 during rotation.

Figure 2:
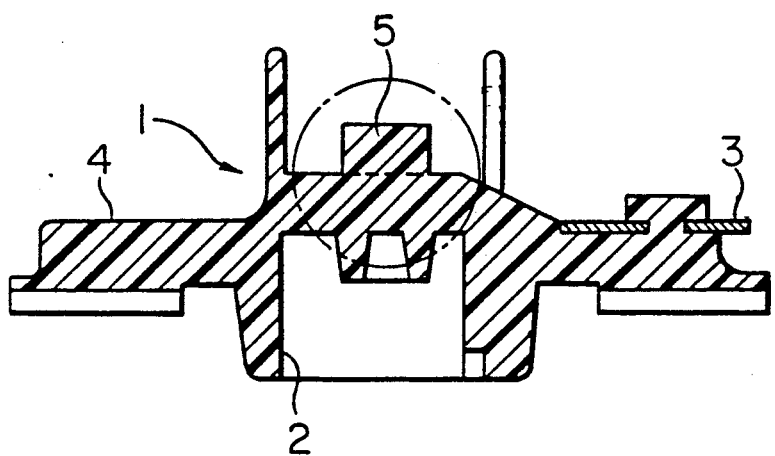
FIG. 2 is a vertical cross-sectional view of the distributor rotor of FIG. 1 at an intermediate stage during the manufacture thereof.
Figure 3:
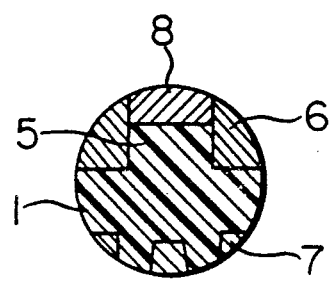
FIG. 3 is a cross-sectional view of the portion surrounded by the circle in FIG. 2 as it appears during the injection step of molding.
Figure 4:
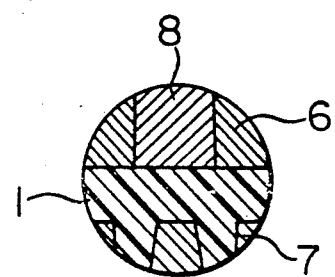
FIG. 4 is a cross-sectional view of the same portion as it appears in the subsequent compression step of molding.

The method of molding this distributor rotor 1 is illustrated in FIGS. 2 through 4. First, in an injection step, a resin molding material is injected into a mold cavity defined by two mold halves 6 and 7. As shown in FIG. 3, the upper mold half 6 has a movable plunger 8 which is slidably disposed at the center thereof above the center of the rotor 1 on the top side thereof. When the resin molding material is injected into the mold cavity, the plunger 8 is initially raised, and the molding material fills the space below the plunger 8 to temporarily form a projection 5 in the center of the rotor 1 on the top surface thereof. FIG. 2 illustrates the shape of the distributor rotor 1 during the injection step. When the mold cavity and the space below the plunger 8 are completely filled with the resin molding material, then in a compression step, the plunger 8 is forcefully lowered to the position shown in FIG. 4 in which the lower surface of the plunger 8 is flush with the inner surface of the upper mold half 6. The resin molding material forming the projection 5 is thereby forced into the body of the rotor 1, and the central portion of the rotor 1 beneath the plunger 8 is compressed. Next, in a cooling step, the resin molding material is solidified by cooling in a conventional manner while keeping the central portion of the rotor 1 under pressure by means of the plunger 8. When cooling is complete, in a removal step, the distributor rotor 1 is removed from the mold halves 6 and 7 in a conventional manner. The completed rotor 1 then appears as shown in FIG. 1. By making the plunger 8 sufficiently long, it can also be used as an ejector pin for removing the distributor rotor 1 from the mold halves after cooling.

As a result of the compression of the central portion of the rotor 1 during cooling, the formation of voids in the central portion is completely prevented, and the dielectric strength of the central portion is greatly increased. According to experiments performed by the present inventors, the insulating ability of a distributor rotor manufactured in the above manner is approximately three times that of a conventional molded resin rotor. Because of the absence of voids, the dielectric strength of the rotor can also be maintained for a longer period of time. Furthermore, as the central portion has a high density, it has increased mechanical strength.

Figure 5:
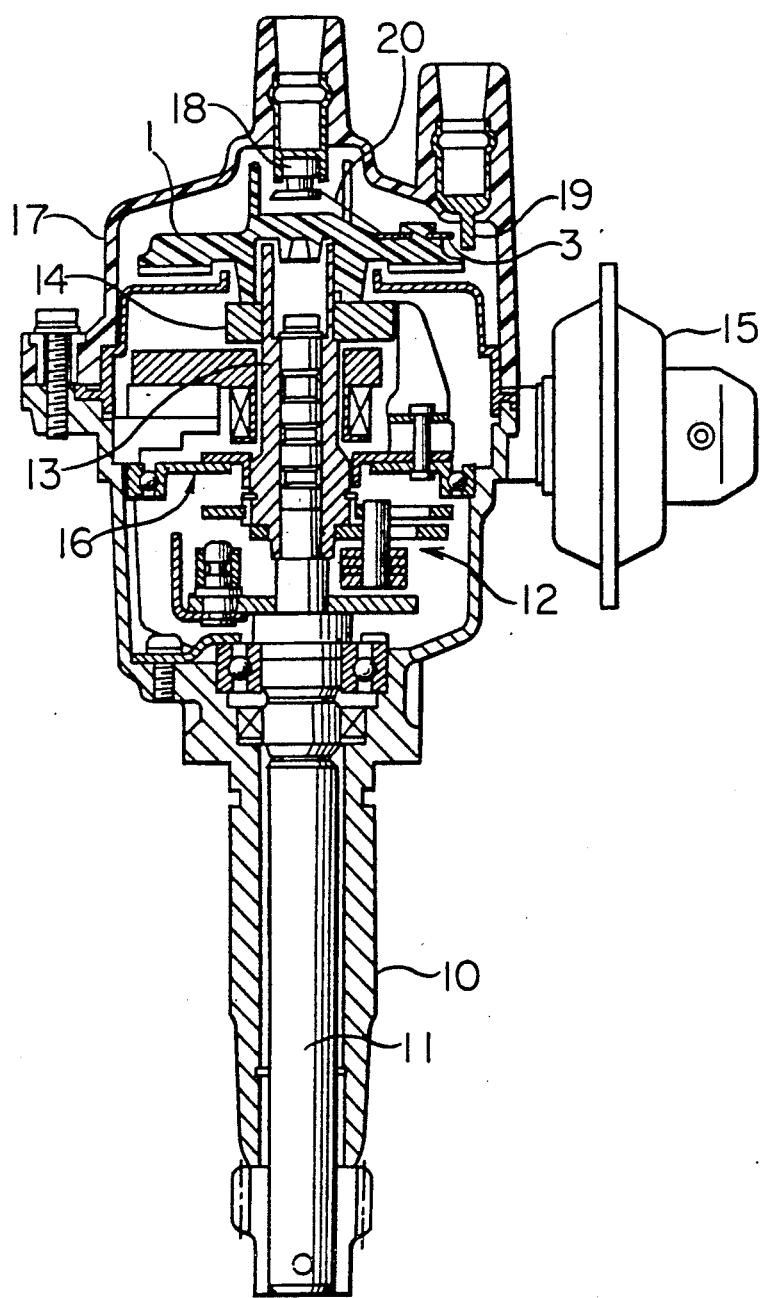
FIG. 5 is a vertical cross-sectional view of an ignition distributor equipped with the distributor rotor of FIG. 1.

FIG. 5 illustrates a conventional ignition distributor for an automotive internal combustion engine which is equipped with the distributor rotor 1 of FIG. 1. The distributor has a distributor body 10 which rotatably supports a distributor shaft 11. The distributor shaft 11 is driven by the camshaft of the unillustrated engine. A centrifugal spark advance mechanism 12 is mounted on the midportion of the distributor shaft 11. The centrifugal spark advance mechanism 12 is connected to a spark advance sleeve 13 which is rotatably mounted on the top portion of the distributor shaft 11. The central cavity 2 of the rotor 1 fits tightly over the upper end of the spark advance sleeve 13 so that the rotor 1 will rotate therewith. A breaker cam 14 is secured to the outside of the spark advance sleeve 13 just below the rotor 1. A vaccum spark advance mechanism 15 is mounted on the outside of the distributor body 10 and is connected to a rotatably supported breaker plate assembly 16 in a conventional manner. The top of the distributor is covered by a removable distributor cap 17 having a high-voltage terminal 18 installed at its center and a plurality of spark plug terminals 19 installed along the outer periphery of the rotor 1, slightly separated from the rotor segment 3. The rotor segment 3 is electrically connected to the high-voltage terminal 18 of the distributor cap 17 by an electrically-conducting leaf spring 20 whose outer end is connected to the rotor segment 3 and whose inner end is in sliding contact with the high-voltage terminal 18.

During the operation of this conventional ignition distributor, there is an extremely high voltage between the rotor segment 3 and the spark advance sleeve 13. However, as the central portion of the rotor 1 which provides insulation between these two members is manufactured by the above-described method and is completely absent of voids, it has an excellent dielectric strength and there is no danger of ground shorts occurring through the center of the rotor 1.

Although the present method was explained with respect to a distributor rotor, it can of course be applied to the manufacture of many other different parts.

What is claimed is:

1. A method of manufacturing a molded resin distributor rotor of an ignition distributor for an internal combustion engine having a central section subject to the formation of voids during molding comprising:

an injection step of injecting a resin molding material into a mold cavity in a mold to completely fill said mold cavity;

a compression step of compressing a portion of the resin molding material in the mold which forms the central section of the distributor rotor;

a cooling step of solidifying the resin molding material by cooling while maintaining said portion under pressure; and a removal step of removing the resulting molded resin article from said mold after said cooling step;

wherein said mold comprises two mold halves, each having an inner surface, which inner surfaces together define the mold cavity, one of said mold halves having a plunger with a molding surface which, in use, contacts the resin molding material, said plunger being slidably disposed such that it can be moved towards and away from the mold cavity, the molding surface of said plunger confronting said portion of the resin molding material subject to the formation of voids during molding, said plunger being retracted from the mold cavity during said injection step so that a space is formed between the molding surface of said plunger and the mold cavity, the resin molding material being injected so as to completely fill said space; and said compression step is carried out directly after said injection step before cooling wherein said compression step comprises pushing said plunger inwards until the molding surface of the plunger is flush with the inner surface of the mold, and maintaining said plunger in this position thereby maintaining substantially constant volume of material in mold, whereby the resin molding material in said space is forced into the mold cavity and said portion of the resin molding material subject to the formation of voids during molding is compressed during the cooling stage to avoid the formation of voids during cooling.

* * * * *